(12) United States Patent
Yamanaka et al.

(10) Patent No.: US 10,576,712 B2
(45) Date of Patent: Mar. 3, 2020

(54) RESIN-COATED METAL SHEET FOR CONTAINER

(71) Applicant: JFE STEEL CORPORATION, Tokyo (JP)

(72) Inventors: Yoichiro Yamanaka, Chiba (JP); Junichi Kitagawa, Fukuyama (JP); Hiroki Nakamaru, Chiba (JP); Norihiko Nakamura, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 192 days.

(21) Appl. No.: 15/560,011

(22) PCT Filed: Mar. 25, 2016

(86) PCT No.: PCT/JP2016/001728
§ 371 (c)(1),
(2) Date: Sep. 20, 2017

(87) PCT Pub. No.: WO2016/152168
PCT Pub. Date: Sep. 29, 2016

(65) Prior Publication Data
US 2018/0065339 A1 Mar. 8, 2018

(30) Foreign Application Priority Data
Mar. 26, 2015 (JP) ................. 2015-064884

(51) Int. Cl.
*B32B 15/09* (2006.01)
*B65D 25/14* (2006.01)
(Continued)

(52) U.S. Cl.
CPC ............ *B32B 15/09* (2013.01); *B32B 15/18* (2013.01); *B32B 27/18* (2013.01); *B32B 27/36* (2013.01);
(Continued)

(58) Field of Classification Search
None
See application file for complete search history.

(56) References Cited

U.S. PATENT DOCUMENTS

| 5,100,708 | A | * | 3/1992 | Heyes | ...................... | B32B 15/08 |
| | | | | | | 428/36.91 |
| 5,591,518 | A | * | 1/1997 | Sumiya | ................... | B32B 15/08 |
| | | | | | | 428/318.4 |

(Continued)

FOREIGN PATENT DOCUMENTS

| CN | 1176171 A | 3/1998 |
| CN | 102448840 A | 5/2012 |

(Continued)

OTHER PUBLICATIONS

JP 2007-253454 A (Kitagawa et al) (published Oct. 4, 2007)—full English translation (Year: 2007).*

(Continued)

*Primary Examiner* — Vivian Chen
(74) *Attorney, Agent, or Firm* — Oliff PLC (57) ABSTRACT

A resin-coated metal sheet for containers that has excellent content releasability is provided. The resin-coated metal sheet includes a resin layer (A) and a resin layer (B). The resin layer (A) has a multilayer structure and is disposed on a side which, after the metal sheet is formed into a container, becomes the inner side of the container. The resin layer (B) is disposed on a side that becomes the outer side of the container. The resin layer (A) contains polyester as a main component and includes an uppermost resin layer (a1). A Raman band intensity ratio ($I_{2968}/I_{3085}$) on the surface of the resin layer (a1) is 0.6 to 0.9. The resin layer (B) includes polyester (I) composed mainly of polyethylene terephthalate and a polyester (II) composed mainly of polybutylene (Continued)

terephthalate. A Raman band intensity ratio on the surface of the resin layer (B) is 0.8 to 1.0.

12 Claims, 2 Drawing Sheets

(51) Int. Cl.
| | |
|---|---|
| B32B 27/18 | (2006.01) |
| B32B 27/36 | (2006.01) |
| B65D 1/16 | (2006.01) |
| C21D 9/46 | (2006.01) |
| C25D 3/10 | (2006.01) |
| B29C 48/00 | (2019.01) |
| B29C 48/21 | (2019.01) |
| B32B 27/08 | (2006.01) |
| B32B 7/02 | (2019.01) |
| C08L 91/06 | (2006.01) |
| B65D 1/12 | (2006.01) |
| B32B 7/023 | (2019.01) |
| B32B 15/20 | (2006.01) |
| C08L 67/03 | (2006.01) |
| B32B 15/08 | (2006.01) |
| B29K 67/00 | (2006.01) |
| B29C 55/12 | (2006.01) |
| B32B 15/18 | (2006.01) |
| B32B 37/20 | (2006.01) |

(52) U.S. Cl.
CPC ............ *B32B 37/203* (2013.01); *B65D 1/165* (2013.01); *B65D 25/14* (2013.01); *C21D 9/46* (2013.01); *C25D 3/10* (2013.01); *B29C 48/0018* (2019.02); *B29C 48/21* (2019.02); *B29C 55/12* (2013.01); *B29K 2067/00* (2013.01); *B29K 2067/003* (2013.01); *B29K 2067/006* (2013.01); *B32B 7/02* (2013.01); *B32B 7/023* (2019.01); *B32B 15/08* (2013.01); *B32B 15/20* (2013.01); *B32B 27/08* (2013.01); *B32B 2250/03* (2013.01); *B32B 2250/04* (2013.01); *B32B 2250/05* (2013.01); *B32B 2270/00* (2013.01); *B32B 2307/308* (2013.01); *B32B 2307/40* (2013.01); *B32B 2307/4026* (2013.01); *B32B 2307/54* (2013.01); *B32B 2307/584* (2013.01); *B32B 2307/702* (2013.01); *B32B 2307/704* (2013.01); *B32B 2307/714* (2013.01); *B32B 2307/7244* (2013.01); *B32B 2307/746* (2013.01); *B32B 2307/752* (2013.01); *B32B 2311/24* (2013.01); *B32B 2311/30* (2013.01); *B32B 2367/00* (2013.01); *B32B 2439/66* (2013.01); *B32B 2439/70* (2013.01); *B65D 1/12* (2013.01); *B65D 1/16* (2013.01); *C08L 67/03* (2013.01); *C08L 91/06* (2013.01); *Y10T 428/31681* (2015.04); *Y10T 428/31786* (2015.04); *Y10T 428/31801* (2015.04)

(56) References Cited

U.S. PATENT DOCUMENTS

| | | | | |
|---|---|---|---|---|
| 5,753,377 A | * | 5/1998 | Takahashi | B32B 15/08 428/480 |
| 6,025,056 A | * | 2/2000 | Machii | B32B 15/08 428/204 |
| 2004/0101698 A1 | * | 5/2004 | Yamanaka | B32B 15/08 428/461 |
| 2004/0219316 A1 | * | 11/2004 | Takahashi | B32B 15/08 428/35.7 |
| 2005/0260417 A1 | * | 11/2005 | Yamanaka | B32B 15/08 428/425.8 |
| 2006/0147733 A1 | * | 7/2006 | Yamanaka | B32B 15/08 428/458 |
| 2006/0210817 A1 | * | 9/2006 | Yamanaka | B32B 15/08 428/458 |
| 2007/0071944 A1 | * | 3/2007 | Matsubara | B32B 15/08 428/141 |
| 2008/0261063 A1 | * | 10/2008 | Yamanaka | B32B 15/08 428/483 |
| 2009/0068481 A1 | * | 3/2009 | Yamanaka | B32B 15/08 428/458 |
| 2014/0339123 A1 | * | 11/2014 | Nakagawa | B32B 15/09 206/524.2 |
| 2015/0122812 A1 | * | 5/2015 | Nakagawa | B32B 15/09 220/62.13 |
| 2016/0009444 A1 | * | 1/2016 | Nakagawa | B32B 15/09 206/524.2 |
| 2016/0257099 A1 | * | 9/2016 | Yamanaka | B65D 25/14 |
| 2016/0355294 A1 | * | 12/2016 | Yamanaka | B05D 7/14 |
| 2017/0008256 A1 | * | 1/2017 | Yamanaka | B05D 7/14 |
| 2017/0266924 A1 | * | 9/2017 | Nakamura | B32B 15/09 |

FOREIGN PATENT DOCUMENTS

| | | | |
|---|---|---|---|
| CN | 104023974 A | | 9/2014 |
| EP | 2 436 609 A1 | | 4/2012 |
| EP | 2 799 227 A1 | | 11/2014 |
| JP | 2001-328204 A | * | 11/2001 |
| JP | 2002-347170 A | * | 12/2002 |
| JP | 2004-168365 A | * | 6/2004 |
| JP | 2005-139365 A | * | 6/2005 |
| JP | 2005-342911 A | * | 12/2005 |
| JP | 2006-205575 A | * | 8/2006 |
| JP | 2007-055687 A | * | 3/2007 |
| JP | 2007-253454 A | * | 10/2007 |
| JP | 2008-188918 A | * | 8/2008 |
| JP | 2009-166354 A | * | 7/2009 |
| WO | WO 2013/099563 A | * | 7/2013 |
| WO | WO 2014/132541 A | * | 9/2014 |
| WO | WO 2015/064100 A | * | 5/2015 |

OTHER PUBLICATIONS

JP 2006-205575 A (Kitagawa et al) published Aug. 10, 2006)—full English translation (Year: 2006).*
Jun. 28, 2016 International Search Report issued in Patent Application No. PCT/JP2016/001728.
Aug. 21, 2018 Office Action issued in Canadian Application No. 2,976,747.
Sep. 13, 2018 Office Action issued in Chinese Application No. 201680015495.2.
Nov. 27, 2017 Search Report issued in European Patent Application No. 16768071.9.
Jul. 21, 2017 Office Action issued in U.S. Appl. No. 15/032,816.
Nov. 30, 2017 Office Action issued in U.S. Appl. No. 15/032,816.
Oct. 23, 2018 Office Action issued in U.S. Appl. No. 15/032,816.
May 13, 2019 Office Action issued in U.S. Appl. No. 15/032,816.

* cited by examiner

CROSS-SHAPED CUT (PENETRATING TO BASE STEEL SHEET)

ROLLING DIRECTION OF STEEL SHEET

FIG. 4

CORRODED PORTION

ONE-SIDE MAXIMUM CORROSION WIDTH

RESIN-COATED METAL SHEET FOR CONTAINER

TECHNICAL FIELD

The present disclosure relates to a resin-coated metal sheet for containers that is used for can bodies, lids, etc. of food can containers.

BACKGROUND ART

Metal sheets such as tin-free steel (TFS) sheets and aluminum sheets that are used as metal can materials for food can containers are conventionally painted for the purpose of improving corrosion resistance, durability, weather resistance, etc. However, the technique used for painting has problems such as its complicated baking process, a long treatment time, and discharge of a large amount of solvents. To solve these problems, resin-coated metal sheets prepared by laminating thermoplastic resin films onto heated metal sheets have been developed as substitutes for the painted metal sheets and are currently used widely for industrial purposes, mainly for beverage can materials.

A problem with the use of a resin-coated metal sheet for a food can container is that, since the contents of the container strongly stick to the inner surface of the container when the contents are taken out of the container, the contents are not easily taken out. This problem is closely related to consumer purchasing intention and is a very important issue in terms of ensuring the consumer purchasing intention. Nevertheless, there are very few studies on improvement in the ease of releasing contents from the conventional resin-coated metal sheets (their content releasability).

Accordingly, the present inventors have conducted extensive studies to secure content releasability and found that, when the contents include a large amount of fatty ingredients (e.g., a mixture of meat, eggs, and carbohydrates), good content releasability can be secured by adding a specific wax to a polyester resin such that the wax is present on the surface of the resin. Thus, the inventors have filed Patent Literature 1.

The inventors have further conducted studies and found that, when the interfacial free energy between water and the surface of a resin layer that is to be disposed on the inner side of a container is 30 mN/m or more, excellent content releasability can be obtained even for highly sticking contents (such as luncheon meat) with a high protein content. The inventors have also found that the above surface state can be obtained by adding a fatty acid amide and filed Patent Literatures 2 and 3. The effects of the addition of the fatty acid amide is obtained when the amount added is 0.5 mass % or more. Specifically, it is known that, to obtain the effects sufficiently, the fatty acid amide must be added such that its content is 5.0 mass % or more in at least the uppermost layer of the resin layer that is in contact with the contents.

Desirably, food can containers have inner surfaces with content releasability and outer surfaces that are not adversely affected when the containers are subjected to high-temperature sterilization treatment such as retort treatment. When a resin coating (laminated coating) is applied to the outer surface of a can by thermal-fusion bonding of an ordinary polyester resin film, a problem arises in that the polyester resin film is discolored when subjected to high-temperature sterilization treatment such as retort treatment. This is a phenomenon in which fine air bubbles are formed in the resin layer and scatter light to thereby cause a cloudy appearance. In Patent Literature 4 by the present inventors, design is ensured even after retort sterilization treatment by forming a resin layer on the side which, after the formation of a container, becomes the outer side of the container using a polyester composition prepared by mixing a polyester including ethylene terephthalate as a main repeating unit and a polyester including butylene terephthalate as a main repeating unit at a specific ratio.

CITATION LIST

Patent Literature

PTL 1: Japanese Unexamined Patent Application Publication No, 2001-328204
PTL 2: Japanese Unexamined Patent Application Publication No, 2007-55687
PTL 3: Japanese Unexamined Patent Application Publication No. 2008-188918
PTL 4: Japanese Unexamined Patent Application Publication No. 2005-342911

SUMMARY

Technical Problem

However, the technique described in Patent Literature 1 may be insufficient to ensure good content releasability for contents with a high protein content such as luncheon meat and tuna because of their strong stickiness.

To ensure sufficient content releasability using the techniques described in Patent Literatures 2 and 3, at least 5.0 mass % of fatty acid amide must be added to the resin layer or the uppermost resin layer. In this case, it has been found that the adhesion between the resin layer and the metal sheet or between the uppermost resin layer and a lower resin layer deteriorates and therefore sufficient formability into a container may not be ensured.

With the technique described in Patent Literature 4, the retort whitening phenomenon of the outer can surface can be reliably prevented, but no consideration is given to the crystal structure of the film. Therefore, it has been found that the adhesion and corrosion resistance of the film may not be ensured in a retort environment.

Another problem is that no method has been found for providing both the performance required of the inner surface of a formed can and the performance required of the outer surface.

The present disclosure has been made to solve the above problems, and it is an object to provide a resin-coated metal sheet for containers that can stably meet various properties required of container materials such as good content releasability from the inner surface of a can, good retort whitening resistance of the outer surface of the can, and adhesion and corrosion resistance on the inner and outer sides of the can.

Solution to Problem

The present inventors have conducted extensive studied to solve the above problems and found the following. As for a resin layer (A) which is included in a resin-coated metal sheet for a container and is to be disposed on the inner side of the container after the formation of the container, a wax component is added to an uppermost resin layer (a1) of the resin layer (A) that is to be in contact with the contents of the container, and the crystal structure of the resin layer (a1) is controlled. In this manner, the resin-coated metal sheet for the container can have excellent content releasability and meet other required properties (such as adhesion and corrosion resistance). As for a resin layer (B) that is to be disposed on the outer side of the container, the blend ratio of polyethylene terephthalate to polybutylene terephthalate is optimized, and the crystal structure of resin layer (B) is controlled. In this manner, excellent retort whitening resistance can be obtained, and other required properties (such as adhesion and corrosion resistance) can be met.

[1] A resin-coated metal sheet for containers, comprising: a metal sheet; a resin layer (A) having a multilayer structure and containing, as a main component, a polyester that is a polymer of an acid component and a glycol component, the resin layer (A) being disposed on a side which, after the metal sheet is formed into a container, becomes an inner side of the container; and a resin layer (B) containing a polyester as a main component and disposed on a side which becomes an outer side of the container, wherein i) the acid component which is a constitutional unit of the polyester contained as the main component of the resin layer (A) comprises a terephthalic acid unit in an amount of at least 85 mol %, ii) the resin layer (A) includes an uppermost resin layer (a1) that is to be in contact with contents of the container to be formed, the uppermost resin layer (a1) containing a wax component in an amount of 0.10 to 2.0 mass % with respect to the mass of the uppermost resin layer (a1) and having a thickness within a range of 0.5 μm or more and 10 μm or less, iii) the ratio ($I_{2968}/I_{3085}$) of a Raman band intensity ($I_{2968}$) at 2,968±5 $cm^{-1}$ measured by Raman spectroscopy on a surface of the resin layer (a1) to a Raman band intensity ($I_{3085}$) at 3,085±5 $cm^{-1}$ measured on the surface of the resin layer (a1) is 0.6 or more and 0.9 or less, iv) the resin layer (B) contains a polyester (I) that is polyethylene terephthalate or copolymerized polyethylene terephthalate containing 15 mol % or less of a copolymerization component and a polyester (II) that is polybutylene terephthalate or copolymerized polybutylene terephthalate containing 15 mol % or less of a copolymerization component, and the ratio of the polyester (I) to the polyester (II) is 10:90 to 60:40 based on mass %, and v) the ratio ($I_{2968}/I_{3085}$) of a Raman band intensity ($I_{2968}$) at 2,968±5 $cm^{-1}$ measured by Raman spectroscopy on a surface of the resin layer (B) to a Raman band intensity ($I_{3085}$) at 3,085±5 $cm^{-1}$ measured on the surface of the resin layer (B) is 0.8 or more and 1.0 or less.

[2] The resin-coated metal sheet for containers according to [1], wherein the wax component comprises carnauba wax.

[3] The resin-coated metal sheet for containers according to [1] or [2], wherein the resin layer (B) has a multilayer structure including at least two layers.

[4] The resin-coated metal sheet for containers according to any one of [1] to [3], wherein the resin layer (B) has a multilayer structure including at least two layers, wherein one of the at least two layers that is in contact with the metal sheet contains a coloring agent, and wherein the content of the coloring agent with respect to the total mass of the at least two layers included in the resin layer (B) is 0.1 to 50 mass %.

Advantageous Effects

According to the present disclosure, a resin-coated metal sheet for containers that exhibits good content releasability from various contents is obtained. The resin-coated metal sheet for containers of the present disclosure can stably meet various properties required of food can materials.

DESCRIPTION OF EMBODIMENTS

The resin-coated metal sheet for containers of the present disclosure will next be described in detail. A metal sheet used in the present disclosure will be described first.

The metal sheet used in the present disclosure may be, for example, an aluminum or mild steel sheet widely used as a can material or a sheet prepared by subjecting the aluminum or mild steel sheet to any of various surface treatments. In particular, for example, a surface-treated steel sheet (a so-called TFS) having a two-layer coating including a lower layer formed of metal chromium and an upper layer formed of chromium hydroxide is most suitable.

No particular limitation is imposed on the coating weights of the metal chromium layer and the chromium hydroxide layer of the TFS. From the viewpoint of adhesion after processing and corrosion resistance, the coating weight of the metal chromium layer is preferably within the range of 70 to 200 $mg/m^2$ in terms of Cr, and the coating weight of the chromium hydroxide layer is preferably within the range of 10 to 30 $mg/m^2$ in terms of Cr.

[Composition of Resin Layer (A) to be Disposed on Inner Side of Container]

In the present disclosure, a resin layer (A) having a multilayer structure and containing a polyester as a main component is disposed on the side which, after the metal sheet is formed into a container, becomes the inner side of the container. The resin layer (A) is characterized in that the polyester, which is the main component, is prepared by polymerization of an acid component (dicarboxylic acid component) and a glycol (diol) component and that the acid component, which is a constitutional unit of the polyester, comprises a terephthalic acid unit in an amount of at least 85 mol %. The main component means that the content of the polyester contained in the resin layer (A) with respect to the total mass of resins in the resin layer (A) is 80 mass % or more. The content of the polyester contained in the resin layer (A) with respect to the total mass of the resins in the resin layer (A) is preferably 85 mass % or more, more preferably 90 mass % or more, and still more preferably 95 mass % or more and may be 100 mass %. When the acid component, which is a constitutional unit of the polyester, comprises a unit other than the terephthalic acid unit in an amount of more than 15 mol %, the melting point of the resins becomes low. In this case, the resins are softened by frictional heat during forming of a container, and damage such as film shaving may occur. Moreover, during retort sterilization treatment after the formation of the container, water vapor attacks the resin layer, and this may cause deterioration in the adhesion in a wet environment.

At least 85 mol % of the acid component which is a constitutional unit of the polyester is a unit derived from terephthalic acid, but a unit derived from an acid component other than terephthalic acid may be contained in an amount within the range of 15 mol % or less.

Examples of the acid component other than terephthalic acid include dicarboxylic acids other than terephthalic acid. Examples of the dicarboxylic acids include: aromatic dicarboxylic acids such as isophthalic acid, naphthalenedicarboxylic acid, diphenyldicarboxylic acid, sodium 5-sulfoisophthalate, and phthalic acid; aliphatic dicarboxylic acids such as oxalic acid, succinic acid, adipic acid, sebacic acid, dimer acids, maleic acid, and fumaric acid; and alicyclic dicarboxylic acids such as cyclohexanedicarboxylic acid. Moreover, an oxycarboxylic acid such as p-oxybenzoic acid may be used as the acid component other than terephthalic acid. Any one of these acid components may be used alone, or a combination of two or more types may be used.

Examples of the glycol component include: aliphatic glycols such as ethylene glycol, propanediol, butanediol, pentanediol, hexanediol, and neopentyl glycol; alicyclic glycols such as cyclohexanedimethanol; and aromatic glycols such as bisphenol A and bisphenol S. Any one of these glycol components may be used alone, or a combination of two or more types may be used.

[Wax Component]

The present disclosure is characterized in that the resin layer (A) includes at least two layers and that an uppermost (outermost) resin layer (a1) that to be in contact with contents contains a wax component in an amount of 0.10 to 2.0 mass % with respect to the mass of the uppermost resin layer (a1). The purpose of the addition of the wax component is to reduce the surface free energy of the resin layer (A), and the addition of the wax component makes it difficult for the contents to stick to the resin layer (A) and thereby improves the content releasability. The reason for limiting the amount of the wax component to 0.10 mass % or more is that, if the amount is less than 0.10 mass %, the above effect is weak and the content releasability deteriorates. The reason for limiting the amount of the wax component to 2.0 mass % or less is that, if the amount exceeds 2.0 mass %, it is technically difficult to form films in this range and low productivity causes an increase in cost.

The wax component as used herein means a wax component in a broad sense, and examples thereof include: natural waxes such as plant waxes, animal waxes, mineral waxes, and petroleum waxes; and synthetic resins such as polyethylene waxes, polypropylene waxes, Fischer-Tropsch waxes, oil- and fat-based synthetic resins (esters, ketones, and amides), and hydrogenated waxes. Any of the wide variety of waxes may be used so long as the effect of reducing the surface free energy of the resin layer (a1) is obtained. Polyethylene waxes, polypropylene waxes, and olefin waxes prepared by mixing two or more of these waxes have larger molecular weights than other wax components, and some of them are not clearly classified as either wax or resin. The wax component defined in the present disclosure encompasses any of these wax components so long as a reduction in surface free energy, which is the object of the present disclosure, can be achieved.

Preferably, the wax component added is a natural wax. More preferably, the natural wax added is a natural wax having an ester group. The wax component is most preferably carnauba wax, which is a natural wax. Carnauba wax is a material having a long-chain alkyl group in its molecule and having low surface free energy. Therefore, carnauba wax tends to concentrate on the surface of the resin layer (a1), and the effect of reducing the surface free energy of the resin layer (a1) is large. In addition, because of the presence of ester groups, carnauba wax is highly compatible with polyesters, strongly sticks to the surface of the resin layer (a1), and is unlikely to be separated. Therefore, carnauba wax can reduce the surface free energy of the resin layer more stably and effectively than other waxes. A polyester resin containing carnauba wax can be produced by adding a prescribed amount of wax component to the polyester and subjecting the mixture to an ordinary production process.

The wax component has, in addition to the effect of improving content releasability, the effect of improving formability. Therefore, the wax component may be added to a resin layer (B) disposed on the side which, after the formation of a container, becomes the outer side of the container. When the wax component is added to the resin layer (B), it is preferable that the amount of the wax component added to the resin layer (B) is 5 mass % or less. If the amount of the wax component added to the resin layer (B) is more than 5 mass %, transfer of the wax component may occur when the resin-coated metal sheet is wound into a roll, and this may cause a problem. In addition, printability may deteriorate.

[Oriented Structure of Resin Layer (a1)]

The uppermost resin layer (a1) is characterized in that the ratio ($I_{2968}/I_{3085}$) of a Raman band intensity ($I_{2968}$) at $2,968\pm5$ cm$^{-1}$ by Raman spectroscopy on the surface of the resin layer (a1) to a Raman band intensity ($I_{3085}$) at $3,085\pm5$ cm$^{-1}$ is 0.6 or more and 0.9 or less. The Raman band intensity ($I_{3085}$) at $3,085\pm5$ cm$^{-1}$ and the Raman band intensity ($I_{2968}$) at $2,968\pm5$ cm$^{-1}$ are the highest peak height of the Raman band within the range of $3,085\pm5$ cm$^{-1}$ and the highest peak height of the Raman band within the range of $2,968\pm5$ cm$^{-1}$, respectively.

The Raman band intensity ($I_{2968}$) at $2,968\pm5$ cm$^{-1}$ by Raman spectroscopy reflects the amount of C—H bonds present in the diol component on the surface of the resin layer. When the Raman band intensity ($I_{2968}$) is large in a relative sense, polyester resin chains on the film surface are randomly oriented. This state is considered to include many amorphous portions present on the surface of the resin layer. The Raman band intensity ($I_{3085}$) at $3,085\pm5$ cm$^{-1}$ by Raman spectroscopy reflects the amount of C—H bonds present in benzene rings on the surface of the resin layer. When this intensity is large in a relative sense, aromatic ring planes such as benzene ring planes are parallel to the surface directions of the resin layer. This state is considered to include many crystal portions present on the surface.

Therefore, in a structure in which the Raman band intensity ratio ($I_{2968}/I_{3085}$) is small, crystals on the surface of the resin layer (a1) are oriented in the surface directions of the resin layer (a1). As the Raman band intensity ratio ($I_{2968}/I_{3085}$) increases, the degree of orientation of the crystals in the surface directions of the resin layer (a1) decreases.

The present inventors have conducted extensive studies on the oriented structure of polyester molecular chains on the surface of the resin layer (a1) by Raman spectroscopy and found that, when the ratio ($I_{2968}/I_{3085}$) of the Raman band intensity ($I_{2968}$) at $2,968\pm5$ cm$^{-1}$ to the Raman band intensity ($I_{3085}$) at $3,085\pm5$ cm$^{-1}$ is controlled to 0.6 or more and 0.9 or less, the content releasability is dramatically improved. The reason for this is shown below.

When the molecular chains of the polyester used as the main component of the resin layer (a1) form an oriented crystal structure, the wax component such as carnauba wax added to the resin layer (a1) cannot be present in the oriented crystal structure because the crystal lattice of the wax component is larger than the distance between the molecular chains. Therefore, the wax component is present only in the non-oriented structure of polyester molecular chains. The glass transition temperature (Tg) (° C.) of the polyester resin included in the resin layer (a1) is about 70° C. At a temperature equal to or lower than this temperature, the movement of the molecular chains is frozen, and the wax component is fixed within the non-oriented structure. Therefore, in a process in which a container is formed, filled with contents, and sealed, the structure of the resin layer (a1) is stable, and the wax component stays within the non-oriented structure in the resin layer (a1). However, when the container is heated to about 120 to about 130° C. in a retort sterilization treatment process, the Brownian motion of the molecular chains forming the non-oriented structure of the polyester resin is started, and this allows the wax component to move in the polyester molecular chains. Since the wax component has a lower surface free energy than the polyester resin, the wax component diffuses to the surface of the resin layer (a1) and concentrates on the surface. This causes the surface free energy of the resin layer (a1) to decrease, and good content releasability is obtained. The content releasability is improved by increasing the concentration of the wax component on the surface of the resin layer (a1).

To increase the surface concentration of the wax component, it is necessary to control the oriented structure of the polyester resin included in the resin layer (a1). Specifically, it is necessary to form an oriented structure that allows the wax component in the resin layer (a1) to smoothly diffuse to the surface of the resin layer (a1). The inventors have conducted studies and found that, when the number of polyester molecular chains oriented parallel to the surface directions of the resin layer (a1) is increased to increase the degree of orientation, the surface concentration of the wax component is significantly reduced. This is because the polyester molecular chains are oriented in a direction perpendicular to the direction of diffusion of the wax and act like a diffusion barrier. The polyester molecular chains oriented as described above also function as a barrier layer against chlorine ions, water, and oxygen that cause corrosion. Therefore, it is necessary to control the degree of orientation of the polyester molecular chains in the surface directions of the film such that the function of increasing the surface concentration of the wax is balanced with the barrier function against the corrosion factors.

Therefore, the ratio ($I_{2968}/I_{3085}$) of the Raman band intensity ($I_{2968}$) at 2,968±5 $cm^{-1}$ by Raman spectroscopy to the Raman band intensity ($I_{3085}$) at 3,085±5 $cm^{-1}$ is controlled to 0.6 or more and 0.9 or less.

Within the above range, the wax component can smoothly concentrate on the surface, and this allows good content releasability to be obtained while sufficient barrier properties against the corrosion factors are ensured. If the Raman band intensity ratio ($I_{2968}/I_{3085}$) exceeds 0.9, the degree of orientation becomes insufficient, and the barrier properties deteriorate. In this case, deterioration in corrosion resistance may occur. If the Raman band intensity ratio ($I_{2968}/I_{3085}$) is less than 0.6, the degree of orientation is excessively high, and the increase in the surface concentration of the wax component is inhibited, so that sufficient content releasability is not obtained. The Raman band intensity ratio ($I_{2968}/I_{3085}$) is preferably 0.7 or more and 0.9 or less.

The Raman band intensity refers to both the intensity in an MD direction (a direction parallel to the longitudinal direction of the resin-coated, metal sheet) and the intensity in a TD direction (a direction perpendicular to the longitudinal direction of the resin-coated metal sheet). In the present disclosure, it is necessary that, on the surface of the resin layer (a1), both the Raman band intensity ratio ($I_{2968}/I_{3085}$) in the MD direction and the Raman band intensity ratio ($I_{2968}/I_{3085}$) in the TD direction fall within the range of 0.6 or more and 0.9 or less.

[Thickness (Average Film Thickness) of Resin Layer (a1)]

The thickness of the resin layer (a1) is within the range of 0.5 μm or more and 10 μm or less. This is because of the following reason. The amount of the wax component added is limited to 2.0 mass % or less with respect to the mass of the resin layer (a1). Therefore, if the thickness of the resin layer (a1) is less than 0.5 μm, the amount of the wax contained is insufficient, and sufficient content releasability is not obtained. If the thickness of the resin layer (a1) exceeds 10 μm, the ratio of the resin layer (a1) to the resin layer (A) is excessively high. In this case, the adhesion between the resin layer (A) and the metal sheet, the formability of the resin layer (A), and functions such as corrosion resistance may deteriorate. Therefore, the thickness of the resin layer (a1) is 0.5 μm or more and 1.0 μm or less. The thickness of the resin layer (a1) is preferably 1.0 μm or more and 5.0 μm or less. No particular limitation is imposed on the method for measuring the thickness of the resin layer (a1). The thickness may be measured by SEM observation, observation of a cross section of the resin layer under a transmission polarizing microscope, etc.

[Thickness (Average Film Thickness) of Resin Layer (A) Excluding Thickness (Average Film Thickness) of Uppermost Resin Layer (a1)]

The thickness of the resin layer (A) except for the resin layer (a1), i.e., the thickness of a resin layer (a2), is preferably 5 μm or more and 20 μm or less. The resin layer (a2) is a layer located between the resin layer (a1) and the metal sheet. If the thickness of the resin layer (a2) is less than 5 μm, it may not be possible for the resin layer (a2) to have resin strength enough to provide the interfacial adhesion between the resin layer (a2) and the resin layer (a1) while the adhesion to the metal sheet is ensured. If the thickness of the resin layer (a2) exceeds 20 μm, it is not expected to further improve the functions required of beverage can materials and food can materials, and only the cost of the resin may increase.

Therefore, the thickness of the resin layer obtained by subtracting the thickness of the uppermost resin layer (a1) from the thickness of the resin layer (A), i.e. the thickness of the resin layer (a2), is preferably 5 μm or more and 20 μm or less. More preferably, the thickness of the resin layer (a2) is 7 μm or more and 15 μm or less. No particular limitation is imposed on the method for measuring the thickness of the resin layer (a2), and the thickness of the resin layer (a2) may be measured by the same method as that for the resin layer (a1).

Preferably, the resin layer (A) has a structure in which the uppermost (outermost) resin layer (a1) and the resin layer (a2) located between the resin layer (a1) and the metal sheet are stacked one on another. Preferably, in the structure of the resin layer (A), the resin layer (a1) contains the wax component, and the resin layer (a2) contains no wax component. Preferably, in the resin layer (A), each of the resin layers forming the resin layer (A) contains, as a main component, a polyester which is a polymer of an acid component and a glycol component, and the acid component which is a constitutional unit of the polyester comprises a terephthalic acid unit in an amount of at least 85 mol %. The above layer structure is not limited to the two-layer structure, and the resin layer (a2) may comprise three or more layers.

[Crystal Structure of Resin Layer (A) to be Disposed on Inner Side of Container]

As for the crystal structure of the resin layer (A), its crystal size $\chi$ in the (100) plane obtained by X-ray diffraction measurement is preferably 6.0 nm or less, more preferably 5.5 nm or less, still more preferably 5.0 nm or less, and particularly preferably 4.5 nm or less. When the crystal size $\chi$ in the (100) plane is within the above range, laminatability can be easily improved. The crystal size $\chi$ in the (100) plane is determined by reflection X-ray diffraction using the Scherrer equation. The crystal size in the (100) plane is determined by the polymer forming the resin, additives, the conditions of film formation, the condition of heat treatment, etc., and a crystal size of 6.0 nm or less can be achieved by setting them arbitrarily. For example, it is preferable to lower the temperature of heat treatment and shorten the time of the heat treatment, but the properties required of the resin must be satisfied. The above X-ray diffraction measurement method is an example of the method for measuring the crystal size and is not a limitation.

[Composition of Resin Layer (B) to be Disposed on Outer Side of Container]

The composition of the resin layer (B) that is to be disposed on the outer side of a container contains, as essential ingredients: a polyester (I) that is polyethylene terephthalate or copolymerized polyethylene terephthalate containing 15 mol % or less of a copolymerization component; and a polyester (II) that is polybutylene terephthalate or copolymerized polybutylene terephthalate containing 15 mol % or less of a copolymerization component, and the ratio of the polyester (I) to the polyester (II) is 10:90 to 60:40 based on mass %. The resin layer (B) contains the polyester (I) and the polyester (II) as main components. The main components mean that the total content of the polyester (I) and the polyester (II) contained in the resin layer (B) is 80 mass % or more with respect to the total mass of the resins in the resin layer (B). The total content with respect to the total mass of the resins in the resin layer (B) is preferably 85 mass % or more, more preferably 90 mass % or more, and still more preferably 95 mass % or more and may be 100 mass %. The resin-coated metal sheet for containers of the present disclosure has the configuration described above and therefore has the effect of preventing the whitening phenomenon that may occur during retort sterilization treatment. When a food can produced using a metal sheet coated with a polyester resin is subjected to the retort sterilization treatment, the phenomenon in which a resin layer on the outer side is whitened often occurs. In this case, fine air bubbles are formed in the resin layer and scatter light to thereby cause a cloudy appearance. In addition, the air bubbles formed in the resin layer have the following features. First, no air bubbles are formed when the can is heated in a dry heat environment. When an empty can that is not filled with contents is subjected to the retort sterilization treatment, no air bubbles are formed. It is not the case that air bubbles are observed over the entire thickness of the outer resin layer. Air bubbles are observed in the vicinity of the interface in contact with the steel sheet.

In view of these features, the formation of air bubbles in the outer resin layer due to the retort sterilization treatment is considered to occur through the following mechanism. The can is exposed to high-temperature water vapor from the beginning of the retort sterilization treatment, and part of the water vapor enters the outer film and reaches the vicinity of the interface with the steel sheet. At the beginning of the retort sterilization treatment, the vicinity of the interface between the outer resin and the steel sheet is cooled by the contents from the inner side, and therefore the water vapor entering the interface becomes condensed water. Then, as the retort sterilization treatment time increases, the temperature of the contents increases, and the condensed water at the interface with the steel sheet is re-vaporized. The resulting water vapor again passes through the resin layer and is discharged to the outside. It is inferred that the spaces that have been occupied by the condensed water become air bubbles.

Therefore, to prevent whitening by preventing the formation of air bubbles in the outer resin layer of the can during the retort sterilization treatment, it is effective to rapidly crystallize an amorphous polyester layer in the outer polyester resin layer by the heat of the retort sterilization treatment to thereby increase the strength of the amorphous layer. Specifically, it is preferable that the shortest semi-crystallization time of the polyester resin layer (film) is 100 seconds or shorter. The shortest semi-crystallization time of the film means as follows. The semi-crystallization time is determined in a temperature range in which the polymer (resin) forming the film is crystallized, and the shortest semi-crystallization time within the temperature range is used as the shortest semi-crystallization time of the film. A short semi-crystallization time means that the rate of thermal crystallization is high. When the shortest semi-crystallization time is equal to or shorter than 100 seconds, the formation of air bubbles can be effectively prevented, and whitening can be prevented. If the shortest semi-crystallization time is longer than 100 seconds, it may be difficult to prevent the whitening phenomenon. This is because since the rate of crystallization of the resin is low, the heat during the retort sterilization treatment does not allow the crystallization of the amorphous polyester layer to proceed sufficiently, so that the increase in strength is not enough to prevent the formation of air bubbles.

The semi-crystallization time is measured by a depolarized light intensity method using a polymer crystallization rate measuring device. In the present application, the measurement is performed using a polymer crystallization rate measuring device type MK-801 manufactured by Kotaki Seisakusho Co., Ltd. A sample (sample weight: 8 mg) is placed between orthogonal polarizing plates, heated to the highest melting point of resins 50° C. in nitrogen for 1 minute in a melting furnace installed in the device, then moved into a crystallization bath immediately after the heating, and immersed in the crystallization bath such that the temperature of the sample reaches an equilibrium measurement temperature in 10 seconds, and then the measurement is started. Transmitted light due to an optically anisotropic crystal component that increases in amount as the degree of crystallization of the sample placed between the orthogonal polarizing plates increases is measured at different sample temperatures, and the time when the degree of crystallization reaches ½ is computed as the semi-crystallization time using the Avrami equation below. The shortest time among the values at different sample temperatures is used as the shortest semi-crystallization time.

The above highest melting point is used when a plurality of components with different meting points are present and is the highest temperature among the different meting points. When the highest melting point is determined by measurement, differential scanning calorimetry may be used. In the present application, a differential scanning calorimeter (DSC Q100 manufactured by TA Instruments) is used for the measurement at a heating rate of 20° C./minute, and the highest temperature among one or at least two endothermic peak temperatures obtained (temperatures at maximum depths of the endothermic peaks) is used as the highest melting point.

[Formula 1]

$1 - Xc = \exp(-kt^n)$ $Xc$: Degree of crystallization, $k$:

crystallization rate constant, $n$: Avrami exponent, $t$: time (seconds)

$I_0$: Intensity of transmitted depolarized light (starting point)

$1 - Xc = \dfrac{(I_t - I_g)}{I_0 - I_g}$ $I_t$: Intensity of transmitted depolarized light (after $t$ seconds)

$I_g$: Intensity of transmitted depolarized light (endpoint)

As described in New Experimental Chemistry (Maruzen Co., Ltd.) and Kobunshi Kagaku Vol. 29, No. 323, P. 139 and Vol. 29, No. 325, P. 336 (The Society of Polymer Science, Japan), the depolarized light intensity method is an effective method for measuring a fast crystallization rate.

In consideration of the time until the sample reaches thermal equilibrium, a point in time 10 seconds after the sample is moved into the crystallization bath is set to t=0 seconds, and then the measurement is started. The intensity of transmitted depolarized light measured at t=0 seconds is denoted as $I_0$ and the intensity of transmitted depolarized light is plotted against Log t. The intensity of transmitted depolarized light at a point at which the crystallization temperature curve becomes a straight line is denoted as $I_g$.

One specific method for obtaining a resin layer (B) having a shortest semi-crystallization time of 100 seconds or shorter is as follows. The resin layer (B) is prepared by mixing the polyester (I) that is polyethylene terephthalate or copolymerized polyethylene terephthalate containing 15 mol % or less of a copolymerization component and the polyester (II) that is polybutylene terephthalate or copolymerized polybutylene terephthalate containing 15 mol % or less of a copolymerization component. The resin layer (B) has a composition such that the ratio of the polyester (I) to the polyester (II) is 10:90 to 60:40 based on mass %. Preferably, the ratio of the polyester (I) to the polyester (II) is 10:90 to 50:50 based on mass %.

If the ratio of the polyester (I) to the total mass of the polyester (I) and the polyester (II) is more than 60 mass % and the ratio of the polyester (II) to the total mass is less than 40 mass %, the formation of air bubbles in the film during the retort sterilization treatment cannot be prevented, and the resin layer (B) is whitened, so that the design deteriorates significantly.

If the ratio of the polyester (I) to the total mass of the polyester (I) and the polyester (II) is less than 10 mass % and the ratio of the polyester (II) to the total mass is more than 90 mass %, the occurrence of the whitening phenomenon during the retort sterilization treatment can be prevented. However, since the elastic modulus of the resin layer (B) decreases excessively, the resin layer is easily scratched during conveyance or forming. In addition, the cost of the resins becomes excessively high, and this is not practically suitable.

The polyethylene terephthalate is obtained by a condensation reaction of a terephthalic acid component and an ethylene glycol component. The copolymerized polyethylene terephthalate is obtained by copolymerization of a terephthalic acid component, an ethylene glycol component, and a copolymerization component other than these components. When the content of the copolymerization component (a constitutional unit derived from the copolymerization component) in the copolymerized polyethylene terephthalate is 15 mol % or less, the effects of the present disclosure are not impaired. The copolymerization component may be an acid component or may be an alcohol component. Examples of the acid component include: aromatic dicarboxylic acids such as isophthalic acid, phthalic acid, and naphthalenedicarboxylic acid aliphatic dicarboxylic acids such as adipic acid, azelaic acid, sebacic acid, and decanedicarboxylic acid; and alicyclic dicarboxylic acids such as cyclohexanedicarboxylic acid. Examples of the alcohol component include: aliphatic diols such as butanediol and hexanediol; and alicyclic diols such as cyclohexanedimethanol. Any one of these copolymerization components may be used alone, or a combination of two or more types may be used. The melting point of the resulting polymer (polyester (I)) is preferably 210 to 256° C., more preferably 215 to 256° C., and still more preferably 220 to 256° C., but this depends on the type of copolymerization component. If the melting point of the polymer is lower than 210° C., heat resistance may be low. If the melting point of the polymer exceeds 256° C., the crystallinity of the polymer is excessively high, and formability may be impaired.

The polybutylene terephthalate is obtained by a condensation polymerization reaction of a terephthalic acid component and a 1,4-butanediol component. The copolymerized polybutylene terephthalate is obtained by copolymerization of a terephthalic acid component, a 1,4-butanediol component, and a copolymerization component other than these components. When the content of the copolymerization component (a constitutional unit derived from the copolymerization component) in the copolymerized polybutylene terephthalate is 15 mol % or less, the effects of the present disclosure are not impaired. The copolymerization component may be an acid component or may be an alcohol component. Examples of the acid component include: aromatic dicarboxylic acids such as isophthalic acid, phthalic acid, and naphthalenedicarboxylic acid; aliphatic dicarboxylic acids such as adipic acid, azelaic acid, sebacic acid, and decanedicarboxylic acid; and alicyclic dicarboxylic acids such as cyclohexanedicarboxylic acid. Of these, isophthalic acid, 2,6-naphthalenedicarboxylic acid, and adipic acid are preferred. Examples of the alcohol component include: aliphatic diols such as ethylene glycol and hexanediol; and alicyclic diols such as cyclohexanedimethanol. When any of these copolymerization components are used, any one of these may be used alone, or a combination or two or more types may be used. The melting point of the resulting polymer (polyester (II)) is preferably 180° C. or higher, more preferably 200° C. or higher, and still more preferably 210° C. or higher, but this depends on the type of copolymerization component. If the melting point of the polymer is lower than 180° C., its crystallinity is low, and the heat resistance may be low. As judged from the difference in melting point between polyethylene terephthalate and polybutylene terephthalate, the melting point of the polyester (II) is generally lower than the melting point of the polyester (I). Preferably, the melting point of the polyester (II) is equal to or lower than the melting point of the polyester (I).

The intrinsic viscosity of the polyester (I) is preferably 0.50 to 0.80, more preferably 0.54 to 0.70, and particularly preferably 0.57 to 0.65. If the intrinsic viscosity of the polyester (I) is less than 0.50, a resin film having a mechanical strength enough for practical use may not be obtained. If the intrinsic viscosity of the polyester (I) exceeds 0.80, formability may be impaired. The intrinsic viscosity of the polyester (II) is preferably 0.60 to 2.00, more preferably 0.80 to 1.70, and particularly preferably 0.85 to 1.50. If the intrinsic viscosity of the polyester (II) is less than 0.60, a resin film having a mechanical strength enough for practical use may not be obtained. No particular limitation is imposed on the upper limit of the intrinsic viscosity of the polyester (II), but it is preferable in terms of the productivity of the polyester (II) and the resin film that the intrinsic viscosity is 2.00 or less. No particular limitation is imposed on the method for measuring the intrinsic viscosity. For example, a measurement method described in ASTM D4603 may be used for the determination.

The resin layer (B) which, after the formation of a container, is to be disposed on the outer side of the container may be composed of a single layer or a plurality of layers. Preferably, the total thickness of the resin layer is 5 to 20 µm. If the thickness of the resin layer (B) is less than 5 µm, the resin layer (B) may be rubbed and scratched during forming or conveyance of a can. In this case, the metal surface may be exposed, so that the appearance may deteriorate. In addition, corrosion may occur from the exposed metal portion during long-term storage. Even when the thickness of the resin layer (B) is more than 20 µm, no performance advantages are obtained, and this may cause an unnecessary cost increase.

By adding a coloring agent to the resin layer (B), which, after the formation of a container, is to be disposed on the outer side of the container, the base metal sheet can be hidden, and various color tones unique to the resin can be imparted. The base metal layer may not be hidden completely. In this case, a shining color can be imparted by utilizing the metallic luster of the base, and good design can be obtained. Since the surface of the resin is not printed but the coloring agent is added directly to the resin to impart a color, a color fading problem does not occur in a container forming process, and a good appearance can be maintained. Generally, a container is painted and printed after its formation. However, by forming a colored resin layer, part of the process can be omitted. This allows a reduction in cost, a reduction in the amount of an organic solvent, and a reduction in the amount of carbon dioxide generated. Preferably, the coloring agent added is a pigment. It is necessary for the pigment to provide good design after the formation of a container. It is preferable from this point of view that the pigment used is an inorganic pigment such as titanium dioxide or an organic pigment such as an anthraquinone-based pigment, an isoindolinone-based pigment, a benzimidazolone-based pigment, a quinophthalone-based pigment, or a condensed azo-based pigment.

Preferably, the resin layer to which the coloring agent is added is not the uppermost layer (outermost layer). The above pigment is characterized in that it is unlikely to bleed to the surface of the resin layer even after heat treatment such as retort sterilization treatment. By providing, on the resin layer with the pigment added thereto, a resin layer of 0.5 µm or more to which no pigment is added, bleeding can be reliably prevented.

Preferably, the resin layer (B) has a layered structure including an uppermost (outermost) resin layer (b1) and a resin layer (b2) disposed between the resin layer (b1) and the metal sheet. In a preferred structure of the resin layer (B), the resin layer (b1) contains no coloring agent, and the resin layer (b2) contains the coloring agent. Preferably, each of the resin layers included in the resin layer (B), i.e., each of the resin layer (b1) and the resin layer (b2), contains, as a main component, a polyester including the polyester (I) and the polyester (II), and the ratio of the polyester (I) to the polyester (II) is 10:90 to 60:40 based on mass %. The resin layer (b2) may be composed of a single layer or two or more layers.

Preferably, the content of the coloring agent with respect to the resin layer (B) is 0.1 to 50 mass %. If the content is less than 0.1 mass %, color development may be poor. If the content exceeds 50 mass %, transparency may be low, and the color tone may lack brightness. Preferably, the content of the coloring agent in each of the resin layers (the resin layer (b1) and the resin layer (b2)) is 0.1 to 50 mass %, in terms of ease of obtaining good color development and ease of obtaining a color tone excellent in transparency and brightness.

[Oriented Structure of Resin Layer (B)]

The ratio ($I_{2968}/I_{3085}$) of the Raman band intensity ($I_{2968}$) at $2{,}968 \pm 5$ cm$^{-1}$ by Raman spectroscopy on the surface of the resin layer (B) to the Raman band intensity ($I_{3085}$) at $3{,}085 \pm 5$ cm$^{-1}$ is 0.8 or more and 1.0 or less.

As the Raman band intensity ratio increases, the degree of orientation of the molecular chains in the film decreases. In this case, although the barrier properties of the film decrease, its formability is improved. The outer surface of a can is not in direct contact with the contents and is not required to have high barrier properties (corrosion resistance). However, during can manufacturing, a large load is generated because the outer surface is in contact with a die etc., and the outer surface is required to have high formability. Therefore, the Raman band intensity ratio ($I_{2968}/I_{3085}$) is set to 0.8 or more, and a film structure that can withstand severe forming such as DI forming is formed. However, since rust may be formed even on the outer surface of the can during long-term storage, it is necessary to ensure a certain degree of barrier properties. When the Raman band intensity ratio ($I_{2968}/I_{3085}$) is 1.0 or less, a film structure that is durable for 3 years, which is a standard storage life of food can containers, is obtained. No particular limitation is imposed on the method for measuring the Raman band intensity. For example, the same method as that for the resin layer (a1) may be used for the measurement. The Raman band intensity refers to both the intensity in the MD direction (the direction parallel to the longitudinal direction of the resin-coated metal sheet) and intensity in the TD direction (the direction perpendicular to the longitudinal direction of the resin-coated metal sheet). In the present disclosure, it is necessary that, on the surface of the resin layer (B), both the Raman band intensity ratio ($I_{2968}/I_{3085}$) in the MD direction and the Raman band intensity ratio ($I_{2968}/I_{3085}$) in the TD direction fall within the range of 0.8 or more and 1.0 or less.

[Production Method]

Next, an example of a method for producing the resin-coated metal sheet for containers of the present disclosure will be described.

First, a method for producing the resin layers (A) and (B) (which may be films) that cover the metal sheet will be described.

No particular limitation is imposed on the method for producing the resin layers (A) and (B). For example, a polyester resin used as a raw material is dried as needed, then supplied to a known melt lamination extruder, extruded from a slit-shaped die into a sheet shape, brought into contact with a casting drum by, for example, a static electricity application method, and cooled and solidified to thereby obtain an unstretched sheet. The unstretched sheet is stretched in its longitudinal and transverse directions to thereby obtain a biaxially stretched film. The stretching ratio can be freely set according to the degree of orientation, strength, elastic modulus, etc. of the intended film. It is preferable in terms of the quality of the film that the film is stretched by a tenter method. It is also preferable to use a sequential biaxial stretching method in which the film is stretched in the longitudinal direction and then stretched in the transverse direction or a simultaneous biaxial stretching method in which the film is stretched in the longitudinal direction and the transverse direction substantially simultaneously.

Next, a method for producing a resin-coated metal sheet by laminating the resin layers (films) onto the metal sheet will be described.

In the present disclosure, for example, the following method may be used. The metal sheet is heated to a temperature higher than the melting points of the films, and the resin films are brought into contact with and thermally fusion-bonded to opposite sides of the metal sheet using compression bonding rolls (hereinafter referred to as laminating rolls) (this method is hereinafter referred to as lamination). In this case, the film which, after the formation of a container, is to be disposed on the inner side of the container is thermally fusion-bonded such that the resin layer (a2) with no wax component added thereto is in contact with the metal sheet.

The lamination conditions are appropriately set such that the resin layers defined in the present disclosure are obtained. First, the surface temperature of the metal sheet at the start of lamination must be equal to or higher than the melting point (Tm) (° C.) of a resin layer to be in contact with the metal sheet. Specifically, it is preferable to control the surface temperature of the metal sheet within the range of Tm to Tm+40° C. When the surface temperature of the metal sheet is equal to or higher than Tm, the resin layer melts, and good adhesion to the metal sheet can be ensured. If the surface temperature of the metal sheet is higher than Tm+40° C., the resin layer melts excessively and may stick to a laminating roll, and it is difficult to control the crystal structure of the resin layer (a1) serving as a surface layer within the range specified in the present disclosure. The surface temperature of the metal sheet is more preferably Tm to Tm+25° C. and still more preferably Tm to Tm+15° C.

In the present disclosure, it is necessary to appropriately control the oriented structure of the uppermost resin layer (a1) of the resin layer (A), and the oriented structure can be controlled by adjusting the surface temperatures of the laminating rolls. Specifically, the surface temperature of a laminating roll to be in contact with the resin layer (a1) may be controlled within the range of from Tg of the resin layer (a1) to Tg+80° C. (Tg is the glass transition temperature of the resin layer (a1)). For the resin layer (B), to control its crystal structure appropriately, the surface temperature of a laminating roll to be in contact with the resin layer (B) may be controlled within the range of from Tg of the resin layer (B)+10° C. to Tg+110° C. (Tg is the glass transition temperature of the resin layer (B)).

Adjustment of the time of contact with the laminating rolls is also an important factor. The time of contact may be controlled within the range of 10 to 20 msec. By controlling the surface temperatures of the laminating rolls and the time of contact with the laminating rolls within the above ranges, the oriented structure of the resin layer (a1) that is defined in the present disclosure can be obtained.

Preferably, the resin layer (A) is heated before the lamination. By softening the resin layer (A) in advance, the temperature distribution in a cross section of the resin layer can be made more uniform during the lamination. It is known that, when the temperature distribution in the cross section of the resin layer is uniform, the crystal structure in the cross section of the resin layer changes gently from the interface with the metal sheet to the surface layer and therefore more uniform performance can be obtained. Specifically, the temperature of the resin layer (A) before the lamination may be controlled within the range of Tg to Tg+30° C. (Tg is the glass transition temperature of the resin layer (A)).

Immediately after completion of the lamination, quenching is performed to fix the crystal structures of the resin layers. The time until quenching is limited to preferably 1 second or shorter and more preferably 0.7 seconds or shorter, and the temperature of quenching water is equal to or lower than Tg of the resin layer (A).

In a preferred production process in the present disclosure, the resins are formed into films, and the films are applied to the metal sheet. The crystal structure defined in the present disclosure may not be obtained by melt extrusion lamination in which the resins are not formed into films but are melted and applied to the surfaces of the metal sheet.

In the present disclosure, the resin-coated metal sheet can be produced by using optimal temperature conditions etc. for each of the resin layers (A) and (B) such that the resin layers (A) and (B) have their respective desired structures described above.

Example 1

Exemplary examples of the present disclosure will next be described.

(Method for Producing Metal Sheet)

A strip-shaped steel sheet subjected to cold rolling, annealing, and temper rolling and having a thickness of 0.18 mm×a width of 977 mm was subjected to degreasing, pickling, and then chromium plating, and a chromium-coated steel sheet (TFS) was thereby produced. The chromium plating was performed in a chromium plating bath containing $CrO_3$, $F^-$ and $SO_4^{2-}$. After intermediate rinsing was performed, electrolysis was performed using a chemical conversion treatment solution containing $CrO_3$ and $F^-$. In this case, the electrolysis conditions (such as current density and the quantity of electricity) were controlled such that the coating weight of metal chromium and the coating weight of chromium hydroxide were 120 $mg/m^2$ and 15 $mg/m^2$, respectively, in terms of chromium.

(Method for Producing Film for Resin Coating on Inner Side of Container)

A resin composition (a raw material of the resin layer (a1)) was prepared by adding a wax component shown in Table 1 to a polyester resin obtained by polymerization of an acid component and a glycol component for the resin layer (a1) shown in Table 1 at a ratio (mol %) shown in Table 1. A polyester resin was obtained by polymerization of an acid component and a glycol component for the resin layer (a2) shown in Table 1 at a ratio (mol %) shown in Table 1, and a resin composition (a raw material of the resin layer (a2)) composed of this polyester resin was prepared. These resin compositions were co-extruded by a routine procedure and cooled and solidified on a cooling drum to thereby obtain an unstretched film. This film was biaxially stretched and heat-set to obtain a biaxially stretched polyester film (the resin layer (A)).

(Method for Producing Film for Resin Coating on Outer Side of Container)

A resin composition (a raw material of the resin layer (b1)) was prepared by Mixing a polyester (I) and a polyester (II) for the resin layer (b1) shown in Table 2 at a mass ratio shown in Table 2 (resin compositions in Nos. 22 to 26 in Table 2 were composed only of a polyester (I) or a polyester (II)). A polyester (I) and a polyester (II) for the resin layer (b2) shown in Table 2 were mixed at a mass ratio shown in Table 2 to obtain a mixture, and a coloring agent shown in Table 2 was added to the mixture to prepare a resin composition (a raw material of the resin layer (b2)) (when the resin layer (B) contained no coloring agent, no coloring agent was added to the resin composition. Each of resin compositions in Nos. 21 to 26 in Table 2 was prepared by adding a coloring agent to a polyester (I)). The resin compositions were melted, dried, co-extruded from a T die, and then cooled and solidified on a cooling drum to thereby obtain an unstretched film including the resin layer (b1) and the resin layer (b2) stacked one on another. Then the unstretched film was biaxially stretched and heat-set to obtain a biaxially stretched polyester film (the resin layer (B)). In Table 2, PET represents polyethylene terephthalate, and PBT represents polybutylene terephthalate. In Table 2, copolymerized PET 1 represents copolymerized polyethylene terephthalate (copolymerized PET) in which the content of isophthalic acid in the copolymer is 4.0 mol %, and copolymerized PET 2 represents copolymerized PET in which the content of isophthalic acid in the copolymer is 5.2 mol %. Copolymerized PET 3 represents copolymerized PET in which the content of isophthalic acid in the copolymer is 12 mol %, and copolymerized PET 4 represents copolymerized PET in which the content of isophthalic acid in the copolymer is 20 mol %. Copolymerized PET 5 represents copolymerized PET in which the content of isophthalic acid in the copolymer is 6.5 mol %. In Table 2, copolymerized PBT 1 represents copolymerized polybutylene terephthalate (copolymerized PBT) in which the content of isophthalic acid in the copolymer is 6.0 mol %, and copolymerized PBT 2 represents copolymerized PBT in which the content of isophthalic acid in the copolymer is 7.8 mol %. Copolymerized PBT 3 represents copolymerized PBT in which the content of isophthalic acid in the copolymer is 6.5 mol %.

(Method for Producing Resin-Coated Metal Sheet for Containers)

Figure 1:
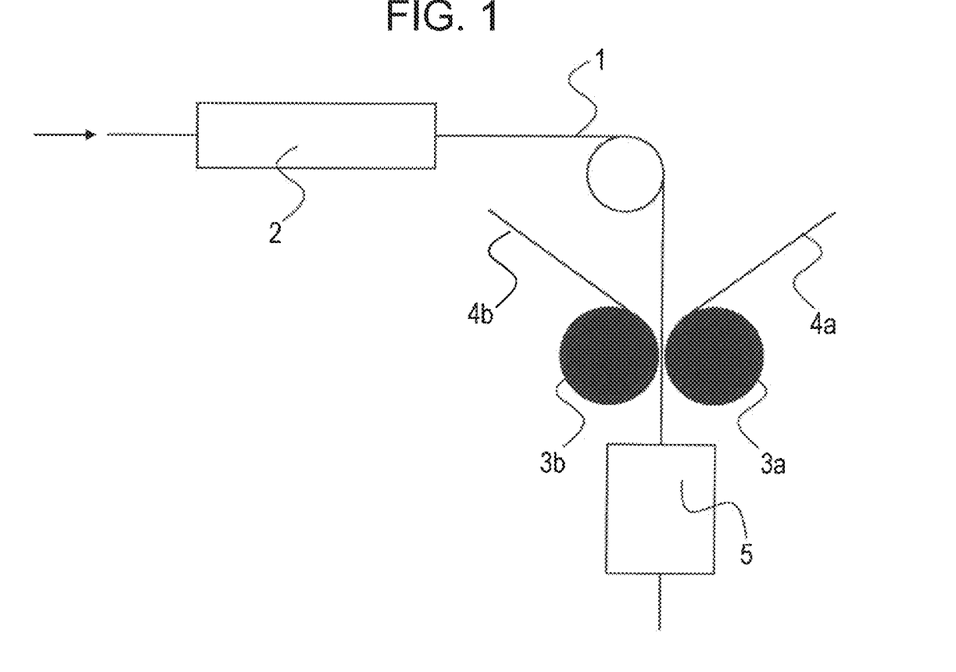
FIG. 1 is an illustration showing a principal part of a laminating device for a metal sheet. (Example 1)

A metal strip laminating device shown in FIG. 1 was used. Specifically, the chromium-coated steel sheet 1 obtained as described above was heated using a metal strip heater 2. Then a polyester film (the resin layer (A)) to be disposed on the inner side of a container after the formation of the container was laminated (thermally fusion-bonded) onto one side of the chromium-coated steel sheet 1 through laminating rolls 3a and 3b, and a polyester film (the resin layer (B)) to be disposed on the outer side of the container was laminated (thermally fusion-bonded) onto the other side.

Figure 2:
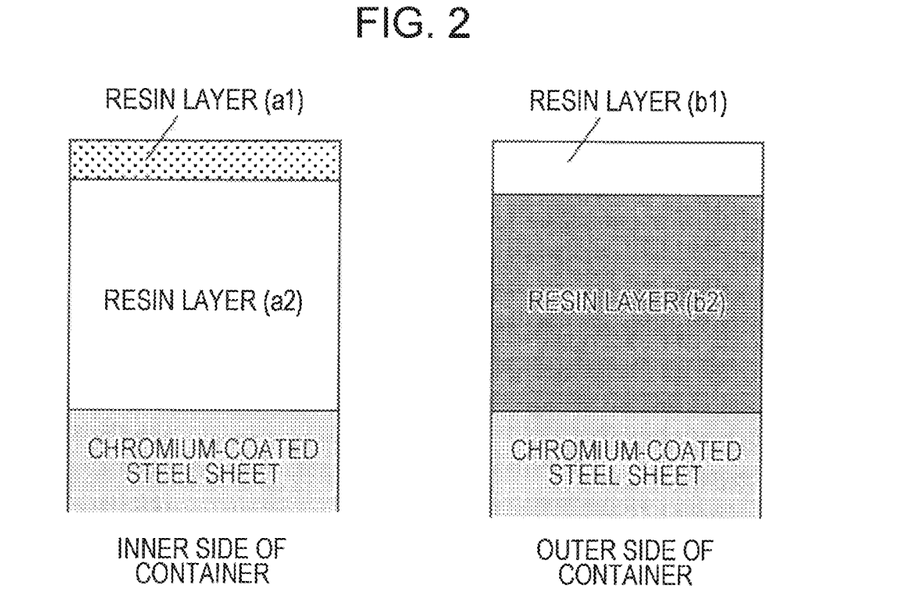
FIG. 2 shows illustrations of a cross-sectional structure of a resin-coated metal sheet for containers. (Example 1)

When the resin layer (A) and the resin layer (B) were laminated onto the metal sheet, the surface temperature of the metal sheet was controlled within the range of from Tm of the resin layer (a1) included in the resin layer (A) or the resin layer (b1) included in the resin layer (B) to Tm+40° C. The surface temperature of the laminating roll 3a was within the range of from Tg of the resin layer (a1) to Tg+80° C., and the surface temperature of the laminating roll 3b was within the range of from Tg of the resin layer (B)+10° C. to Tg+110° C. The time of contact with the metal sheet was within the range of from 10 to 20 msec. The laminating rolls 3a and 3b were of an internal water cooling type, and cooling water was circulated in the rolls to control the temperature during film bonding. The temperature of the resin layer before lamination was within the range of from Tg of the resin layer (a1) to Tg+30° C. to uniformize the temperature distribution in a cross section of the resin layer. Then a metal strip cooling device 5 was used for water cooling (quenching) to thereby produce a resin-coated metal sheet for containers. The production conditions are shown in Table 3. A cross-sectional structure of the thus-produced resin-coated metal sheet for containers is shown in FIG. 2. The thickness of each of the resin layers was measured by observation of a cross section of the resin layers under a transmission polarizing microscope.

TABLE 1

| | Inner side of can: Resin layer (a1) (upper layer) | | | | | | | Inner side of can: Resin layer (a2) (lower layer) | | |
|---|---|---|---|---|---|---|---|---|---|---|
| | Type of resin | | Wax compound | | Raman band intensity ratio ($I_{968}/I_{1085}$) | | | Type of resin | | |
| No. | Acid component (mol %) | Glycol component (mol %) | Type | Content (mass %) | MD direction | TD direction | Thickness (μm) | Acid component (mol %) | Glycol component (mol %) | Thickness (μm) |
| 1 | Terephthalic acid (100) | Ethylene glycol (100) | Carnauba wax | 0.8 | 0.80 | 0.75 | 3.0 | Terephthalic acid (100) | Ethylene glycol (100) | 12.0 |
| 2 | Terephthalic acid (100) | Ethylene glycol (100) | Carnauba wax | 0.7 | 0.82 | 0.78 | 3.0 | Terephthalic acid (100) | Ethylene glycol (100) | 12.0 |
| 3 | Terephthalic acid (100) | Ethylene glycol (100) | Carnauba wax | 0.9 | 0.85 | 0.82 | 3.0 | Terephthalic acid (100) | Ethylene glycol (100) | 12.0 |
| 4 | Terephthalic acid (100) | Ethylene glycol (100) | Carnauba wax | 0.8 | 0.87 | 0.83 | 3.0 | Terephthalic acid (100) | Ethylene glycol (100) | 12.0 |
| 5 | Terephthalic acid (100) | Ethylene glycol (50) Butylene glycol (50) | Carnauba wax | 0.8 | 0.89 | 0.85 | 3.0 | Terephthalic acid (100) | Ethylene glycol (50) Butylene glycol (50) | 12.0 |
| 6 | Terephthalic acid (100) | Ethylene glycol (100) | Carnauba wax | 0.7 | 0.82 | 0.78 | 3.0 | Terephthalic acid (100) | Ethylene glycol (100) | 12.0 |
| 7 | Terephthalic acid (100) | Ethylene glycol (100) | Carnauba wax | 0.8 | 0.90 | 0.85 | 3.0 | Terephthalic acid (100) | Ethylene glycol (100) | 12.0 |
| 8 | Terephthalic acid (100) | Ethylene glycol (100) | Carnauba wax | 0.8 | 0.80 | 0.75 | 3.0 | Terephthalic acid (100) | Ethylene glycol (100) | 12.0 |
| 9 | Terephthalic acid (100) | Ethylene glycol (100) | Carnauba wax | 0.8 | 0.70 | 0.62 | 3.0 | Terephthalic acid (100) | Ethylene glycol (100) | 12.0 |
| 10 | Terephthalic acid (100) | Ethylene glycol (100) | Carnauba wax | 0.2 | 0.82 | 0.78 | 3.0 | Terephthalic acid (100) | Ethylene glycol (100) | 12.0 |
| 11 | Terephthalic acid (100) | Ethylene glycol (100) | Carnauba wax | 1.8 | 0.80 | 0.75 | 3.0 | Terephthalic acid (100) | Ethylene glycol (100) | 12.0 |
| 12 | Terephthalic acid (100) | Ethylene glycol (100) | Carnauba wax | 1.2 | 0.75 | 0.67 | 3.0 | Terephthalic acid (100) | Ethylene glycol (100) | 14.3 |
| 13 | Terephthalic acid (100) | Ethylene glycol (100) | Carnauba wax | 0.7 | 0.80 | 0.75 | 0.7 | Terephthalic acid (100) | Ethylene glycol (100) | 7.0 |
| 14 | Terephthalic acid (100) | Ethylene glycol (100) | Polyethylene wax | 1.0 | 0.78 | 0.74 | 8.0 | Terephthalic acid (100) | Ethylene glycol (100) | 12.0 |
| 15 | Terephthalic acid (100) | Ethylene glycol (100) | Polyethylene wax | 1.5 | 0.80 | 0.75 | 3.0 | Terephthalic acid (100) | Ethylene glycol (100) | 12.0 |
| 16 | Terephthalic acid (90) Isophthalic acid (10) | Ethylene glycol (100) | Carnauba wax | 0.9 | 0.88 | 0.84 | 3.0 | Terephthalic acid (90) Isophthalic acid (10) | Ethylene glycol (100) | 12.0 |
| 17 | Terephthalic acid (87) Isophthalic acid (13) | Ethylene glycol (100) | Carnauba wax | 0.8 | 0.90 | 0.86 | 3.0 | Terephthalic acid (87) Isophthalic acid (13) | Ethylene glycol (100) | 12.0 |
| 18 | Terephthalic acid (100) | Ethylene glycol (100) | Carnauba wax | 0.8 | 0.80 | 0.75 | 3.0 | Terephthalic acid (87) Isophthalic acid (13) | Ethylene glycol (50) Butylene glycol (50) | 12.0 |
| 19 | Terephthalic acid (100) | Ethylene glycol (60) Butylene glycol (40) | Carnauba wax | 0.7 | 0.86 | 0.83 | 3.0 | Terephthalic acid (100) | Ethylene glycol (60) Butylene glycol (40) | 12.0 |
| 20 | Terephthalic acid (100) | Ethylene glycol (100) | Carnauba wax | 0.9 | 0.80 | 0.75 | 3.0 | Terephthalic acid (100) | Ethylene glycol (100) | 12.0 |
| 21 | Terephthalic acid (100) | Ethylene glycol (100) | Carnauba wax | 0.05 | 0.80 | 0.75 | 3.0 | Terephthalic acid (100) | Ethylene glycol (100) | 12.0 |
| 22 | Terephthalic acid (100) | Ethylene glycol (100) | Carnauba wax | 1.2 | 0.96 | 0.95 | 3.0 | Terephthalic acid (100) | Ethylene glycol (100) | 12.0 |
| 23 | Terephthalic acid (100) | Ethylene glycol (100) | Carnauba wax | 1.2 | 0.54 | 0.52 | 3.0 | Terephthalic acid (100) | Ethylene glycol (100) | 12.0 |
| 24 | Terephthalic acid (88) Isophthalic acid (12) | Ethylene glycol (100) | Carnauba wax | 1.2 | 0.85 | 0.82 | 0.1 | Terephthalic acid (88) Isophthalic acid (12) | Ethylene glycol (100) | 14.9 |
| 25 | Terephthalic acid (100) | Ethylene glycol (100) | Carnauba wax | 1.2 | 0.82 | 0.78 | 12.0 | Terephthalic acid (100) | Ethylene glycol (100) | 3.0 |
| 26 | Terephthalic acid (80) Isophthalic acid (20) | Ethylene glycol (100) | Carnauba wax | 0.8 | 0.42 | 0.40 | 3.0 | Terephthalic acid (80) Isophthalic acid (20) | Ethylene glycol (100) | 12.0 |

TABLE 2

| No. | Outer side of can: Resin layer (b1) (upper layer) | | | | | | | Outer side of can: Resin layer (b2) (lower layer) | | | | | | |
|---|---|---|---|---|---|---|---|---|---|---|---|---|---|---|
| | Type of resin | | | | Raman band intensity ratio ($I_{2968}/I_{1468}$) | | Thickness (μm) | Type of resin | | | | Coloring pigment | | Thickness (μm) |
| | Polyester (I) | (parts by mass) | Polyester (II) | (parts by mass) | MD direction | TD direction | | Polyester (I) | (parts by mass) | Polyester (II) | (parts by mass) | Type | Content (mass %) | |
| 1 | PET | (50) | PBT | (50) | 0.90 | 0.90 | 3.0 | PET | (50) | PBT | (50) | Isoindolinone Yellow | 0.8 | 9.0 |
| 2 | PET | (50) | PBT | (50) | 0.90 | 0.90 | 3.0 | PET | (50) | PBT | (50) | Isoindolinone Yellow | 0.7 | 9.0 |
| 3 | PET | (50) | PBT | (50) | 0.90 | 0.90 | 3.0 | PET | (50) | PBT | (50) | Isoindolinone Yellow | 0.9 | 9.0 |
| 4 | PET | (50) | PBT | (50) | 0.90 | 0.90 | 3.0 | PET | (50) | PBT | (50) | Isoindolinone Yellow | 0.8 | 9.0 |
| 5 | PET | (10) | PBT | (90) | 0.94 | 0.92 | 3.0 | PET | (10) | PBT | (90) | Isoindolinone Yellow | 0.8 | 9.0 |
| 6 | PET | (40) | PBT | (60) | 0.90 | 0.90 | 3.0 | PET | (40) | PBT | (60) | Isoindolinone Yellow | 0.7 | 9.0 |
| 7 | PET | (40) | PBT | (60) | 0.90 | 0.90 | 2.0 | PET | (40) | PBT | (60) | Isoindolinone Yellow | 0.8 | 10.0 |
| 8 | PET | (40) | PBT | (60) | 0.90 | 0.90 | 3.0 | PET | (40) | PBT | (60) | — | — | 9.0 |
| 9 | PET | (40) | PBT | (60) | 0.85 | 0.82 | 3.0 | PET | (40) | PBT | (60) | Isoindolinone Yellow | 0.8 | 9.0 |
| 10 | PET | (40) | PBT | (60) | 0.90 | 0.90 | 3.0 | PET | (40) | PBT | (60) | Benzimidazolone | 0.8 | 9.0 |
| 11 | PET | (40) | PBT | (60) | 0.92 | 0.91 | 3.0 | PET | (40) | PBT | (60) | Benzimidazolone | 0.8 | 9.0 |
| 12 | PET | (40) | PBT | (60) | 0.90 | 0.90 | 0.7 | PET | (40) | PBT | (60) | Benzimidazolone | 0.8 | 11.3 |
| 13 | PET | (40) | PBT | (60) | 0.90 | 0.90 | 3.0 | PET | (40) | PBT | (60) | Isoindolinone Yellow | 0.8 | 4.0 |
| 14 | PET | (40) | PBT | (60) | 0.90 | 0.90 | 3.0 | PET | (40) | PBT | (60) | Isoindolinone Yellow | 0.8 | 9.0 |
| 15 | PET | (40) | PBT | (60) | 0.90 | 0.90 | 3.0 | PET | (40) | PBT | (60) | Isoindolinone Yellow | 0.8 | 9.0 |
| 16 | Copolymerized PET 1 | (40) | Copolymerized PBT 1 | (60) | 0.92 | 0.91 | 3.0 | Copolymerized PET 1 | (40) | Copolymerized PBT 1 | (60) | — | — | 9.0 |
| 17 | Copolymerized PET 2 | (40) | Copolymerized PBT 2 | (60) | 0.93 | 0.92 | 3.0 | Copolymerized PET 2 | (40) | Copolymerized PBT 2 | (60) | — | — | |
| 18 | PET | (40) | PBT | (60) | 0.90 | 0.90 | 3.0 | PET | (40) | PBT | (60) | — | — | 9.0 |
| 19 | PET | (60) | PBT | (40) | 0.90 | 0.90 | 3.0 | Copolymerized PET 5 | (50) | Copolymerized PBT 3 | (50) | Isoindolinone Yellow | 0.8 | 9.0 |
| 20 | PET | (40) | PBT | (60) | 0.90 | 0.90 | 3.0 | PET | (60) | PBT | (40) | Isoindolinone Yellow | 0.8 | 9.0 |
| 21 | PET | (40) | PBT | (60) | 0.90 | 0.90 | 3.0 | PET | (100) | — | — | Isoindolinone Yellow | 0.8 | 9.0 |
| 22 | PET | (100) | — | — | 1.05 | 1.00 | 3.0 | PET | (100) | — | — | Isoindolinone Yellow | 0.8 | 9.0 |
| 23 | Copolymerized PET 3 | (100) | — | — | 0.72 | 0.68 | 3.0 | PET | (100) | — | — | Isoindolinone Yellow | 0.8 | 9.0 |
| 24 | — | — | PBT | (100) | 0.90 | 0.90 | 0.1 | Copolymerized PET 3 | (100) | — | — | Isoindolinone Yellow | 0.8 | 11.9 |
| 25 | PET | (100) | — | — | 0.90 | 0.90 | 9.0 | PET | (100) | — | — | Isoindolinone Yellow | 0.8 | 3.0 |
| 26 | Copolymerized PET 4 | (100) | — | — | 0.95 | 0.93 | 3.0 | Copolymerized PET 4 | (100) | — | — | Isoindolinone Yellow | 0.8 | 9.0 |

PET: Polyethylene terephthalate, Copolymerized PET 1: Copolymerized PET containing 4.0 mol % of isophthalic acid, Copolymerized PET 2: Copolymerized PET containing 5.2 mol % of isophthalic acid, Copolymerized PET 3: Copolymerized PET containing 12 mol % of isophthalic acid, Copolymerized PET 4: Copolymerized PET containing 20 mol % of isophthalic acid, Copolymerized PET 5: Copolymerized PET containing 6.5 mol % of isophthalic acid
PBT: Polybutylene terephthalate, Copolymerized PBT 1: Copolymerized PBT containing 6.0 mol % of isophthalic acid, Copolymerized PBT 2: Copolymerized PBT containing 7.8 mol % of isophthalic acid, Copolymerized PBT 3: Copolymerized PBT containing 6.5 mol % of isophthalic acid

TABLE 3

| | | During lamination | | | After lamination | |
|---|---|---|---|---|---|---|
| | | Surface | Surface | Time of | | |
| No. | Surface temperature of metal sheet (° C.) | temperature of laminating roll (3a) (° C.) | temperature of laminating roll (3b) (° C.) | contact with laminating rolls (ms) | Time until quenching (s) | Temperature of quenching water (° C.) |
| 1 | 269 | 120 | 100 | 13 | 0.6 | 60 |
| 2 | 271 | 120 | 100 | 13 | 0.6 | 60 |
| 3 | 273 | 120 | 100 | 13 | 0.6 | 60 |
| 4 | 275 | 120 | 100 | 13 | 0.6 | 60 |
| 5 | 268 | 80 | 70 | 13 | 0.6 | 60 |
| 6 | 271 | 120 | 80 | 13 | 0.6 | 60 |
| 7 | 279 | 120 | 80 | 13 | 0.6 | 60 |
| 8 | 269 | 120 | 80 | 13 | 0.6 | 60 |
| 9 | 267 | 120 | 80 | 13 | 0.6 | 60 |
| 10 | 271 | 120 | 80 | 13 | 0.6 | 60 |
| 11 | 269 | 120 | 80 | 13 | 0.6 | 60 |
| 12 | 270 | 120 | 80 | 13 | 0.6 | 60 |
| 13 | 270 | 120 | 80 | 13 | 0.7 | 60 |
| 14 | 269 | 110 | 80 | 13 | 0.6 | 60 |
| 15 | 269 | 120 | 80 | 15 | 0.6 | 60 |
| 16 | 258 | 120 | 80 | 15 | 0.6 | 60 |
| 17 | 259 | 120 | 80 | 13 | 0.6 | 60 |
| 18 | 270 | 120 | 100 | 15 | 0.6 | 60 |
| 19 | 269 | 120 | 110 | 13 | 0.6 | 60 |
| 20 | 269 | 120 | 110 | 13 | 0.6 | 60 |
| 21 | 269 | 120 | 120 | 13 | 0.6 | 60 |
| 22 | 283 | 120 | 80 | 15 | 0.6 | 60 |
| 23 | 264 | 100 | 100 | 13 | 0.6 | 60 |
| 24 | 255 | 100 | 120 | 13 | 0.6 | 60 |
| 25 | 271 | 120 | 100 | 13 | 0.6 | 60 |
| 26 | 250 | 120 | 120 | 15 | 0.6 | 60 |

(Evaluation of Resin-Coated Metal Sheets for Containers)

The following properties of the resin-coated metal sheets obtained as described above and the resin layers on the metal sheets were measured and evaluated. The methods for measurement and evaluation are shown below.

(1) Measurement of Raman Band Intensity Ratio ($I_{2968}/I_{3085}$) by Raman Spectroscopy The Raman spectra of Raman bands at $2,968\pm5$ cm$^{-1}$ and $3,085\pm5$ cm$^{-1}$ were measured by laser Raman in a direction (MD) parallel to the longitudinal direction of a resin-coated metal sheet and a direction (TD) perpendicular to the longitudinal direction of the resin-coated metal sheet on the surface of the resin layer (a1) and on the surface of the resin layer (B). The heights of the highest peaks in these ranges ($2,968\pm5$ cm$^{-1}$ and $3,085\pm5$ cm$^{-1}$) were used as the Raman band intensities, and the Raman band intensity ratio was determined using the following formula.

$$I = I_{2968}/I_{3085}$$

$I_{2968}$: Raman band intensity at $2,968\pm5$ cm$^{-1}$
$I_{3085}$: Raman band intensity $3,085\pm5$ cm$^{-1}$
(Measurement Conditions)
Excitation light source: Semiconductor laser ($\lambda=530$ nm)
Microscope magnification: 100×
Aperture: 25 μmϕ

Longitudinal direction (MD): Laser light is directed such that a laser polarization plane is parallel to the longitudinal direction of the resin-coated metal sheet.

Transverse direction (TD): Laser light is directed such that the laser polarization plane is perpendicular to the longitudinal direction of the resin-coated metal sheet.

(2) Content Releasability

A resin-coated metal sheet was subjected to a drawing process using a drawing machine and thereby formed into a cup with a blank diameter of 100 mm and a drawing ratio (diameter before forming/diameter after forming) of 1.88. Then the cup was filled with cured meat for luncheon meat (protein content in solids: 60 mass %). After a lid was seamed, retort sterilization treatment (130° C., 90 minutes) was performed. Then the lid was removed, and the cup was inverted to take the content out of the cup. The amount of the contents remaining inside the cup was observed to evaluate the ease of releasing the contents.

(Ratings)

AA: The contents could be taken out by simply inverting the cup (without shaking the cup by hand). The inner surface of the cup was observed with the naked eye after the contents had been taken out, and almost no contents were found to stick to the inner surface.

A: The contents remained inside the cup when the cup was simply inverted. However, by shaking the cup vertically (e.g., by shaking the cup by hand), the contents could be taken out. The inner surface of the cup was observed with the naked eye after the contents had been taken out, and almost no contents were found to stick to the inner surface.

C: The contents were not easily taken out by simply shaking the cup vertically (by simply shaking the cup by hand). The contents were forcibly taken out by increasing the vertical shaking speed significantly or using a utensil such as a spoon. Then the inner surface of the cup was observed with the naked eye, and the contents were found to stick to the inner surface.

(3) Formability Evaluation (Formability into can and Processed State of Films)

A wax was applied to a resin-coated metal sheet, and a disk with a diameter of 165 mm was punched out from the resulting sheet. Then the disk was drawn at a drawing rate of 1.70 to thereby obtain a shallow drawn can. Then this drawn can was redrawn at drawing rates of 1.90 and 2.10. Next, the resulting can was subjected to doming according to a routine procedure and then to trimming and neck-in flanging to thereby form a deep drawn can. Attention was given to a neck-in portion of the above-obtained deep drawn can, and the formability into the can and the processed state of the films were visually inspected. The following ratings were used, and AA and A formability ratings were judged as pass.

(Ratings)

AA: No damage was found in the films after the forming.

A: The metal sheet was formable, but partial discoloration was found in the films.

B: The metal sheet was formable, but film damage was found on the outer surface of the can.

C: The can body was broken, and the metal sheet was not formable.

(4) Retort Whitening Resistance

Can bottoms (can outer surfaces) of cans judged as formable (AA, A, and B) in the formability evaluation in (3) were used for evaluation. Each of the cans was filled with tap water at room temperature, and a lid was seamed to seal the can. Then the can was placed in a steam-type retort sterilization furnace with the can bottom facing downward, and retort treatment was performed at 125° C. for 90 minutes. After the treatment, a change in the appearance of the outer surface of the can bottom was observed.

(Ratings)

AA: No change was found in the appearance.

A: Slight clouding was found in the appearance.

C: The appearance became cloudy (whitening occurred).

(5) Adhesion After Forming 1

Cans judged as pass (AA and A) in the formability evaluation in (3) were used for evaluation. Each of the cans was filled with a solution mixture containing 3% by mass of NaCl and 3% by mass of sodium citrate, and a lid was seamed to seal the can. Next, retort sterilization treatment was performed under the condition of 130° C. for 90 minutes, and the resulting can was left to stand in a thermostatic bath at 38° C. for 90 days. Then the can was cut open, and a sample (width: 15 mm, length: 120 mm) for a peel test was cut out from the can body. Part of a film was peeled from a long-side edge of the cut sample. The peeled film was pulled in a direction opposite to the peeling direction (at an angle of 180°), and a peel test was performed using a tensile tester at a cross head speed of 30 mm/min to evaluate adhesion per 15 mm width. The inner side of the can body was evaluated.

(Ratings)

AA: 10.0 (N) or more.

A: 5.0 (N) or more and less than 10.0 (N)

Less than 5.0 (N)

(6) Adhesion after Forming 2

Cans judged as pass (AA and A) in the formability evaluation in (3) were used for evaluation. A sample for a peel test (width: 15 mm, length: 120 mm) was cut from the body of each can. Part of a film was peeled from a long-side edge of the cut sample. The peeled film was pulled in a direction opposite to the peeling direction (at an angle of 180°), and a peel test was performed using a tensile tester at a cross head speed of 30 mm/min to evaluate adhesion per 15 mm width. The outer side of the can body was evaluated.

(Ratings)

AA: 10.0 (N) or more.

A: 5.0 (N) or more and less than 10.0 (N)

C: Less than 5.0 (N)

(7) Corrosion Resistance 1

Cans judged as pass (AA and A) in the formability evaluation in (3) were used for evaluation. Each of the cans was filled with commercial ketchup (manufactured by KAGOME Co., Ltd.), and a lid was seamed to seal the can. Next, retort sterilization treatment was performed under the condition of 130° C. for 90 minutes, and the resulting can was left to stand in a thermostatic bath at 38° C. for 90 days. Then the concentration of iron dissolved in the contents (ketchup) was measured to evaluate corrosion resistance. The inner side of the can body was evaluated.

(Ratings)

AA: Less than 1 mass ppm.

A: 1 Mass ppm or more and less than 10 mass ppm

C: 10 Mass ppm or more (8) Corrosion Resistance 2

Figure 3:
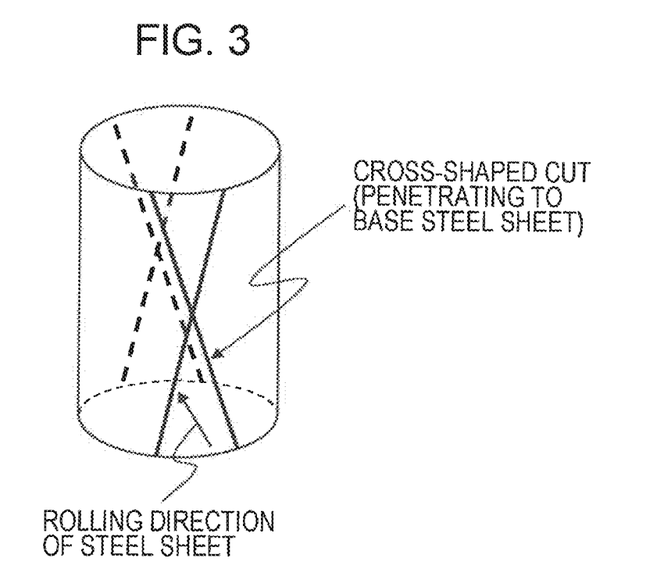
FIG. 3 is an illustration showing the positions of cross-shaped cuts formed in a can body. (Example 1)
Figure 4:
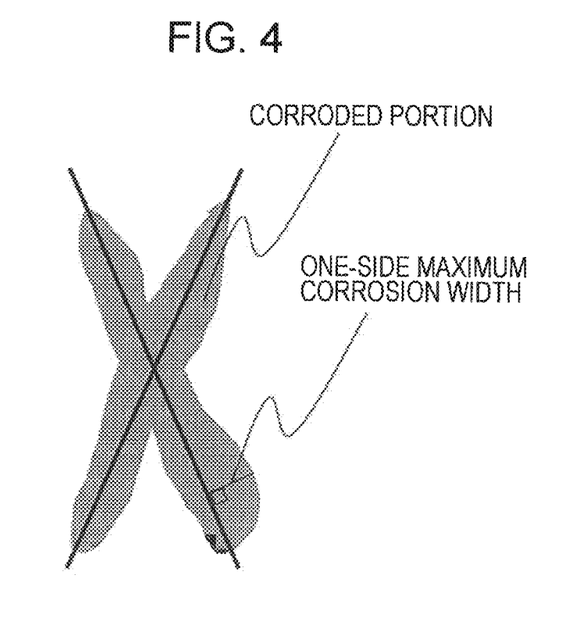
FIG. 4 is an illustration showing a method for measuring a maximum corrosion width from an artificial cut. (Example 1)

Cans judged as pass (AA and A) in the formability evaluation in (3) were used for evaluation. For each of the cans, cross-shaped cuts penetrating to the base steel sheet were formed in two portions of the outer surface of the can, as shown in FIG. 3. Then the can with the cross-shaped cuts was subjected to a salt spray test for 300 hours according to JIS Z 2371, and one-side maximum corrosion widths from the cuts were measured. The measurement method is shown in FIG. 4. The outer side of the can body was evaluated.

(Ratings)

AA: The one-side maximum corrosion width was less than 0.5 mm.

A: The one-side maximum corrosion width was 0.5 mm or more and less than 1.0 mm.

C: The one-side maximum corrosion width was 1.0 mm or more.

The results obtained are shown in Tables 4 and 5.

TABLE 4

| No. | Content releasability | Formability | Adhesion after forming 1 | Corrosion resistance 1 |
|---|---|---|---|---|
| 1 | AA | AA | AA | AA |
| 2 | AA | AA | AA | AA |
| 3 | AA | AA | AA | AA |
| 4 | AA | AA | AA | AA |
| 5 | AA | AA | AA | AA |
| 6 | AA | AA | AA | AA |
| 7 | A | A | A | AA |
| 8 | AA | AA | AA | AA |
| 9 | AA | AA | AA | A |
| 10 | A | AA | AA | AA |
| 11 | AA | AA | A | A |
| 12 | A | AA | AA | AA |
| 13 | AA | A | A | A |
| 14 | A | AA | AA | AA |
| 15 | A | AA | AA | AA |
| 16 | AA | AA | A | A |
| 17 | AA | AA | A | A |
| 18 | AA | AA | A | A |
| 19 | AA | AA | AA | AA |
| 20 | AA | AA | AA | AA |
| 21 | C | AA | AA | AA |
| 22 | AA | AA | C | C |
| 23 | C | C | — | — |
| 24 | C | AA | AA | AA |
| 25 | AA | B | — | — |
| 26 | AA | A | C | C |

TABLE 5

| No. | Retort whitening resistance | Adhesion after forming 2 | Corrosion resistance 2 |
|---|---|---|---|
| 1 | AA | AA | AA |
| 2 | AA | AA | AA |
| 3 | AA | AA | AA |
| 4 | AA | AA | AA |
| 5 | AA | AA | A |

TABLE 5-continued

| No. | Retort whitening resistance | Adhesion after forming 2 | Corrosion resistance 2 |
|---|---|---|---|
| 6 | AA | AA | AA |
| 7 | AA | AA | AA |
| 8 | AA | AA | AA |
| 9 | AA | A | AA |
| 10 | AA | AA | AA |
| 11 | AA | AA | AA |
| 12 | AA | AA | AA |
| 13 | AA | AA | AA |
| 14 | AA | AA | AA |
| 15 | AA | AA | AA |
| 18 | AA | AA | AA |
| 17 | AA | AA | AA |
| 18 | AA | AA | AA |
| 19 | AA | AA | AA |
| 20 | AA | AA | AA |
| 21 | C | AA | A |
| 22 | C | A | A |
| 23 | — | — | — |
| 24 | C | A | A |
| 25 | C | — | — |
| 26 | C | A | A |

As can be seen from Tables 4 and 5, in Inventive Examples, content releasability was good, and other properties were also good. However, in Comparative Examples outside the scope of the disclosure, any of the properties including the content releasability was poor.

INDUSTRIAL APPLICABILITY

The resin-coated metal sheet for containers of the present disclosure is suitable for container applications and packaging applications that require good content releasability. The resin-coated metal sheet can be used for container materials, particularly food can container materials, which are to be subjected to drawing etc.

REFERENCE SIGNS LIST 1 metal sheet (chromium-coated steel sheet)
2 metal strip heater
3a laminating roll (in contact with resin layer (A))
3b laminating roll (in contact with resin layer (B))
4a resin layer (A)
4b resin layer (B)
5 metal strip cooling device

The invention claimed is:
1. A resin-coated metal sheet for containers, comprising:
a metal sheet;
a resin layer (A) having a multilayer structure and containing a polyester as a main component, the polyester being a polymer of an acid component and a glycol component, and the resin layer (A) being disposed on a side which, after the metal sheet is formed into a container, becomes an inner side of the container; and
a resin layer (B) containing a polyester as a main component, and the resin layer (B) being disposed on a side that becomes an outer side of the container,
wherein:
i) the acid component, which is a constitutional unit of the polyester present as the main component of the resin layer (A), comprises a terephthalic acid unit in an amount of at least 85 mol %,
ii) the resin layer (A) includes an uppermost resin layer (a1) that is configured to be in contact with contents of the container, the uppermost resin layer (a1) containing a wax component in an amount of 0.10 to 2.0 mass % with respect to a mass of the uppermost resin layer (a1) and having a thickness within a range of 0.5 μm or more and 10 μm or less,
iii) a ratio ($I_{2968}/I_{3085}$) of a Raman band intensity ($I_{2968}$) at 2,968±5 cm$^{-1}$ measured by Raman spectroscopy on a surface of the resin layer (a1) to a Raman band intensity ($I_{3085}$) at 3,085±5 cm$^{-1}$ measured on the surface of the resin layer (a1) is 0.6 or more and 0.9 or less along a direction parallel to a longitudinal direction of the resin-coated metal sheet and a direction perpendicular to the longitudinal direction of the resin-coated metal sheet,
iv) the resin layer (B) contains a polyester (I) that is polyethylene terephthalate or copolymerized polyethylene terephthalate containing 15 mol % or less of a copolymerization component and a polyester (II) that is polybutylene terephthalate or copolymerized polybutylene terephthalate containing 15 mol % or less of a copolymerization component, and the resin layer (B) includes an uppermost resin layer (b1) that is configured to form an outer surface of the container,
v) a ratio of the polyester (I) to the polyester (II) is 10:90 to 60:40 based on mass %,
vi) a ratio ($I_{2968}/I_{3085}$) of a Raman band intensity ($I_{2968}$) at 2,968±5 cm$^{-1}$ measured by Raman spectroscopy on a surface of the resin layer (b1) to a Raman band intensity ($I_{3085}$) at 3,085±5 cm$^{-1}$ measured on the surface of the resin layer (b1) is 0.8 or more and 1.0 or less along the direction parallel to the longitudinal direction of the resin-coated metal sheet and the direction perpendicular to the longitudinal direction of the resin-coated metal sheet, and
vii) the ratio ($I_{2968}/I_{3085}$) for the resin layer (b1) is higher than the ratio ($I_{2968}/I_{3085}$) for the resin layer (a1) along the direction parallel to the longitudinal direction of the resin-coated metal sheet and the direction perpendicular to the longitudinal direction of the resin-coated metal sheet, and
viii) the ratio ($I_{2968}/I_{3085}$) for the resin layer (b1) is higher than the ratio ($I_{2968}/I_{3085}$) for the resin layer (a1) by at least 0.03 along the direction parallel to the longitudinal direction of the resin-coated metal sheet, and
ix) the ratio ($I_{2968}/I_{3085}$) for the resin layer (b1) is higher than the ratio ($I_{2968}/I_{3085}$) for the resin layer (a1) by at least 0.06 along the direction perpendicular to the longitudinal direction of the resin-coated metal sheet.

2. The resin-coated metal sheet for containers according to claim 1, wherein the wax component comprises carnauba wax.

3. The resin-coated metal sheet for containers according to claim 2, wherein the resin layer (B) has a multilayer structure including at least two layers.

4. The resin-coated metal sheet for containers according to claim 3, wherein:
one of the at least two layers of the resin layer (B), which is in contact with the metal sheet, contains a coloring agent, and
a content of the coloring agent with respect to a total mass of the at least two layers included in the resin layer (B) is 0.1 to 50 mass %.

5. The resin-coated metal sheet for containers according to claim 2, wherein:

the resin layer (B) has a multilayer structure including at least two layers, one of the at least two layers, which is in contact with the metal sheet, contains a coloring agent, and a content of the coloring agent with respect to a total mass of the at least two layers included in the resin layer (B) is 0.1 to 50 mass %.

6. The resin-coated metal sheet for containers according to claim 1, wherein the resin layer (B) has a multilayer structure including at least two layers.

7. The resin-coated metal sheet for containers according to claim 6, wherein:

one of the at least two layers of the resin layer (B), which is in contact with the metal sheet, contains a coloring agent, and a content of the coloring agent with respect to a total mass of the at least two layers included in the resin layer (B) is 0.1 to 50 mass %.

8. The resin-coated metal sheet for containers according to claim 1, wherein:

the resin layer (B) has a multilayer structure including at least two layers, one of the at least two layers, which is in contact with the metal sheet, contains a coloring agent, and a content of the coloring agent with respect to a total mass of the at least two layers included in the resin layer (B) is 0.1 to 50 mass %.

9. The resin-coated metal sheet for containers according to claim 1, wherein the resin layer (A) further includes a resin layer (a2) that is disposed between the uppermost resin layer (a1) and the metal sheet.

10. The resin-coated metal sheet for containers according to claim 9, wherein the resin layer (a2) does not contain a wax component.

11. The resin-coated metal sheet for containers according to claim 9, wherein the thickness of the resin layer (a2) is 5 μm or more and 20 μm or less.

12. The resin-coated metal sheet for containers according to claim 1, wherein:

the ratio ($I_{2968}/I_{3085}$) for the resin layer (a1) is in a range of from 0.6 to 0.88, and the ratio ($I_{2968}/I_{3085}$) for the resin layer (b1) is in a range of from 0.9 to 1.

* * * * *